(12) United States Patent
Macri et al.

(10) Patent No.: US 7,996,731 B2
(45) Date of Patent: Aug. 9, 2011

(54) ERROR DETECTION IN HIGH-SPEED ASYMMETRIC INTERFACES

(75) Inventors: Joseph Macri, Sunnyvale, CA (US);
Stephen Morein, Sunnyvale, CA (US);
Claude Gauthier, Sunnyvale, CA (US);
Ming-Ju E. Lee, Sunnyvale, CA (US);
Lin Chen, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 286 days.

(21) Appl. No.: 11/592,074

(22) Filed: Nov. 1, 2006

(65) Prior Publication Data

US 2007/0098163 A1    May 3, 2007

Related U.S. Application Data

(60) Provisional application No. 60/733,280, filed on Nov. 2, 2005.

(51) Int. Cl.
*G06F 11/00* (2006.01)
(52) U.S. Cl. ........................................... 714/52; 714/758
(58) Field of Classification Search .................. None
See application file for complete search history.

(56) References Cited

U.S. PATENT DOCUMENTS

| | | | | |
|---|---|---|---|---|
| 5,517,508 A * | 5/1996 | Scott | .......................... | 714/776 |
| 5,724,368 A | 3/1998 | Zook | | |
| 6,182,267 B1 * | 1/2001 | Kidd et al. | .................... | 714/807 |
| 6,300,791 B1 * | 10/2001 | Jain | ................... | 326/38 |
| 6,389,539 B1 * | 5/2002 | Hamilton et al. | ............... | 726/21 |
| 6,415,394 B1 * | 7/2002 | Fruehling et al. | ............... | 714/30 |
| 6,625,688 B1 * | 9/2003 | Fruehling et al. | ............. | 711/109 |
| 6,738,939 B2 * | 5/2004 | Udawatta et al. | ............. | 714/726 |
| 6,760,814 B2 * | 7/2004 | Corrigan | ........................ | 711/133 |
| 6,915,475 B1 * | 7/2005 | Tung et al. | ..................... | 714/763 |
| 6,968,478 B1 * | 11/2005 | Edwards et al. | ................ | 714/32 |
| 7,225,373 B1 * | 5/2007 | Edwards et al. | ............. | 714/725 |
| 7,437,641 B1 * | 10/2008 | Gorshe | ......................... | 714/732 |
| 7,506,217 B2 * | 3/2009 | Borin et al. | ..................... | 714/51 |
| 7,577,055 B2 * | 8/2009 | Ngo et al. | ................ | 365/230.08 |
| 7,603,524 B2 * | 10/2009 | Blumrich et al. | ............. | 711/146 |
| 2002/0116662 A1 * | 8/2002 | Hofstee et al. | .................. | 714/25 |
| 2002/0188907 A1 * | 12/2002 | Kobayashi | ..................... | 714/758 |
| 2003/0196086 A1 * | 10/2003 | Murakami et al. | ............ | 713/161 |
| 2004/0088497 A1 * | 5/2004 | Deans et al. | .................. | 711/146 |
| 2004/0098660 A1 | 5/2004 | Dong et al. | | |
| 2007/0266277 A1 * | 11/2007 | Oyamada | ..................... | 714/718 |
| 2007/0288828 A1 * | 12/2007 | Biran et al. | ................... | 714/758 |
| 2008/0288848 A1 * | 11/2008 | Bains | ........................... | 714/758 |

FOREIGN PATENT DOCUMENTS

EP    1 515 235 A1    3/2005

* cited by examiner

*Primary Examiner* — Christopher S McCarthy
(74) *Attorney, Agent, or Firm* — Volpe and Koenig, P.C.

(57) ABSTRACT

A system and method for detecting errors in high-speed asymmetric interfaces are described. Embodiments include transmitting digital data between a first system component and a second system component over a bidirectional interface, wherein the first component is significantly more intelligent than the second component. The first component controls many operations of the second component, including receiving a signature from the second component over an existing line of the interface. The signature received is compared to a signature stored by the first component. Both signatures correspond to a transaction over the interface. Based on the comparison, the first component determines whether the transaction was successful, and directs the second component as necessary.

26 Claims, 5 Drawing Sheets

ERROR DETECTION IN HIGH-SPEED ASYMMETRIC INTERFACES

CROSS-REFERENCE TO RELATED APPLICATIONS

The current application claims the benefit under 35 U.S.C. §119(e) of Provisional Application No. 60/733,280, entitled "Error Detection in High-Speed Asymmetric Interfaces," and filed on Nov. 2, 2005.

TECHNICAL FIELD

Embodiments of the invention relate generally to data transfer in computer and other digital systems, and specifically to error detection in data transfer interfaces.

BACKGROUND

As computer and other digital systems become more complex and more capable, methods and hardware to enhance the transfer of data between system components or elements continually evolve. Data to be transferred include signals representing data, commands, or any other signals. System components or elements can include different functional hardware blocks on a single integrated circuit (IC), or on different ICs. The different ICs may or may not be on the same printed circuit board (PCB). System components typically include an input/output (I/O) interface specifically designed to receive data from other system components and to transmit data to other system components.

One consistent trend as computing systems become more capable is an increase in the amount of data to be transferred per time period. Some applications that require high data rates include game consoles, high definition television (HDTV), personal computer (PC) main memory, graphics processors, and various consumer devices not already mentioned. In response to the demand for increased data rates, double data rate (DDR) standards have been developed to standardize the behavior of hardware and software using high data rates. Several generations of graphics DDR (GDDR) standards have been developed specifically for graphics processing and video processing, which typically demand the capability to transfer and process very large amounts of data.

In some instances, conventional methods for handling well-known digital data transfer issues become impractical or unworkable as data rates become higher. For example, it is known that digital data transmission experiences errors. That is, signals will be incorrectly interpreted as having an incorrect binary value for a variety of reasons. Errors are quantified as an error rate, which can be a number of errors per unit time, or a number of errors per some number of transmissions. In response to this fact of digital data transmission, schemes for error detection and/or correction were developed. One common approach is error checking and correction (ECC), which is a collection of methods to detect errors in transmitted or stored data, and to correct them. This is done in many ways, all of them involving some form of coding. The simplest form of error detection is a single added parity bit or a cyclic redundancy check. Multiple parity bits cannot only detect that an error has occurred, but also which bits have been inverted, and should therefore be re-inverted to restore the original data. The more extra bits are added, the greater the chance that multiple errors will be detectable and correctable.

Conventional methods such as ECC are not practical for DDR interfaces. One reason is that in many DDR applications, the most likely errors are multi-bit errors (affecting more than one bit in a word) that are due to noise or timing issues. ECC is not well adapted to detect and correct such multi-bit errors.

Another reason conventional methods such as ECC are not practical for DDR interfaces is that ECC requires extra pins for parity bits. Additional pins for error detection may also be multiplied further when one system component, such as a processor, must interface with many other components, necessitating error detection and correction for each data path. Probably without exception, it is desirable to maintain as low a pin count as possible in modern mass-produced systems. Therefore, adding pins to handle errors is not a good solution, especially when even more pins may be required in high data rate systems (as compared to lower data rate systems) to provide acceptable error detection and correction.

Another approach to error detection according to various communication standards includes sending a signature with data from the sender to the receiver. The receiver compares the signature with the correct signature, and if there is an error, the sender is asked to retry. This method has disadvantages for many common high data rate applications. For example, the time to perform the comparison and request a retry may be undesirably long. In addition, the method requires an amount of intelligence to be present on both the receiver and transmitter. In many high data rate applications, this is not the case. For example, many high speed memories include a minimum amount of intelligence and are controlled by memory controllers that handle as many logic functions as possible for one or more memories under control. Having memories with minimal intelligence, or logic on board, reduces memory cost (a significant portion of system cost) and increases interface flexibility.

Another way to reduce errors is to run the system at a slower data rate, but that harms the very performance that is usually a goal to be achieved by higher data rates.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Embodiments of a system and method for error detection in high-speed asymmetric interfaces are described herein. In one embodiment, a signature, such as a checksum or cyclic redundancy check (CRC), is computed by both a more intelligent, controller sender/receiver and a less intelligent, controlled sender/receiver. The signatures are compared at the controller sender/receiver and the controller sender/receiver takes any action necessary, including providing direction to the controlled sender/receiver if the signatures do not match. In order for the comparison to take place, the controlled sender/receiver sends its computed signature to the controller sender/receiver using existing transmission paths. In one embodiment, the existing transmission paths include data pins and paths of the sender/receiver interface.

Figure 1:
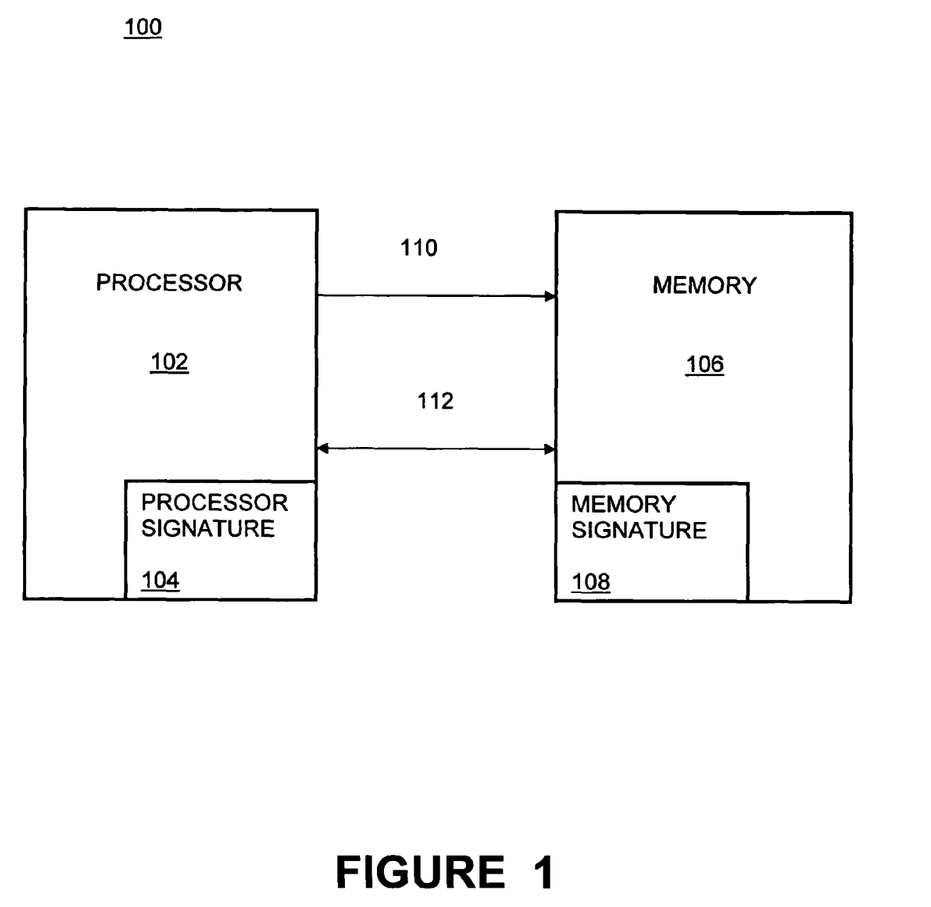
FIG. 1 is a block diagram of a digital system that implements an error correction system, according to an embodiment.

FIG. 1 is a block diagram of components 100 of a digital system according to an embodiment. Components 100 include a more intelligent, controller sender/receiver 102 and a less intelligent, controlled sender/receiver 106. In one embodiment, component 102 is a processor, including a central processing unit and any sub-processor or special purpose processor such as a graphics processor. Component 106 includes one or more memory components in an embodiment, including for example, dynamic random access memory (DRAM), or DDR DRAM. In other embodiments, the more intelligent, controller sender/receiver 102 and the less intelligent, controlled sender/receiver 106 may be other kinds of components. The terms memory and DRAM are both used herein. In general, however, a memory component, including a DRAM, is just an example of a less intelligent, controlled sender/receiver.

In various embodiments, the processor 102 is a client of the memory 106, and provides many logic functions for controlling the operation of the memory 106. In an embodiment, the processor 102 includes a memory controller component for this purpose, but embodiments are not so limited.

Each of the processor 102 and the memory 106 include a respective signature (SN) register. As shown in FIG. 1, the processor 102 includes a signature register 104 and the memory 106 includes a signature register 108. A bidirectional digital communications channel, or interface, or bus, between the processor 102 and the memory 106 includes address/command lines 110 and data lines 112. In various embodiments, the data lines 112 include one or more lines, such as a data mask line for example, not dedicated to transferring data bits.

In one embodiment, the interface between the processor 102 and the memory 106 is a DDR, 32-bit interface. In one embodiment, data is transferred between the processor 102 and 106 through a series of memory READ and WRITE operations. In general, data is stored in memory 106 through WRITE operations issued by the processor 102, and stored data is accessed by processor 102 through READ operations. The size of these operations generally depends on the size of the interface. For example, READ and WRITE operations may entail burst transmissions of 8 transmissions per burst. For a 32-bit interface then, a burst is 256 bits per transmission.

As described further herein, the processor 102 and the memory 106 each compute a signature associated with a series of READ or WRITE operations. The signature can be any type of digital value that can be generated and stored in a register associated with each of the processor 102 and memory 106. In one embodiment, the signature is a checksum comprising a small, fixed number of bits produced by a CRC (cyclic redundancy check) process, or similar hash function. In general, the CRC signature is computed and appended before transmission or storage, and verified by the recipient after reception to confirm that no changes occurred in transit. Any change in the signature indicates the presence of errors due to factors, such as noise in the transmission channels. The signature registers 104 and 108 that store the processor and memory signatures can be any memory location or register(s) within the respective devices that is of sufficient size to store the signature values.

If the READ or WRITE operation between the processor and memory is successful, the signatures will match, indicating that the data was accurately transmitted and received. In various embodiments, the memory 106 computes a signature, and transfers the signature from the memory signature register 108 to the processor 102 for comparison with the signature in the signature register 104. In one embodiment, the transfer of the memory component signature occurs on the bus turnaround at the completion of a READ or WRITE operation. The bus turnaround is a known occurrence that includes the bus being prepared for transmitting data in the direction opposite the current direction of transmission. In one embodiment, the memory component signature is the first data transmitted after the bus turnaround.

Figure 2:
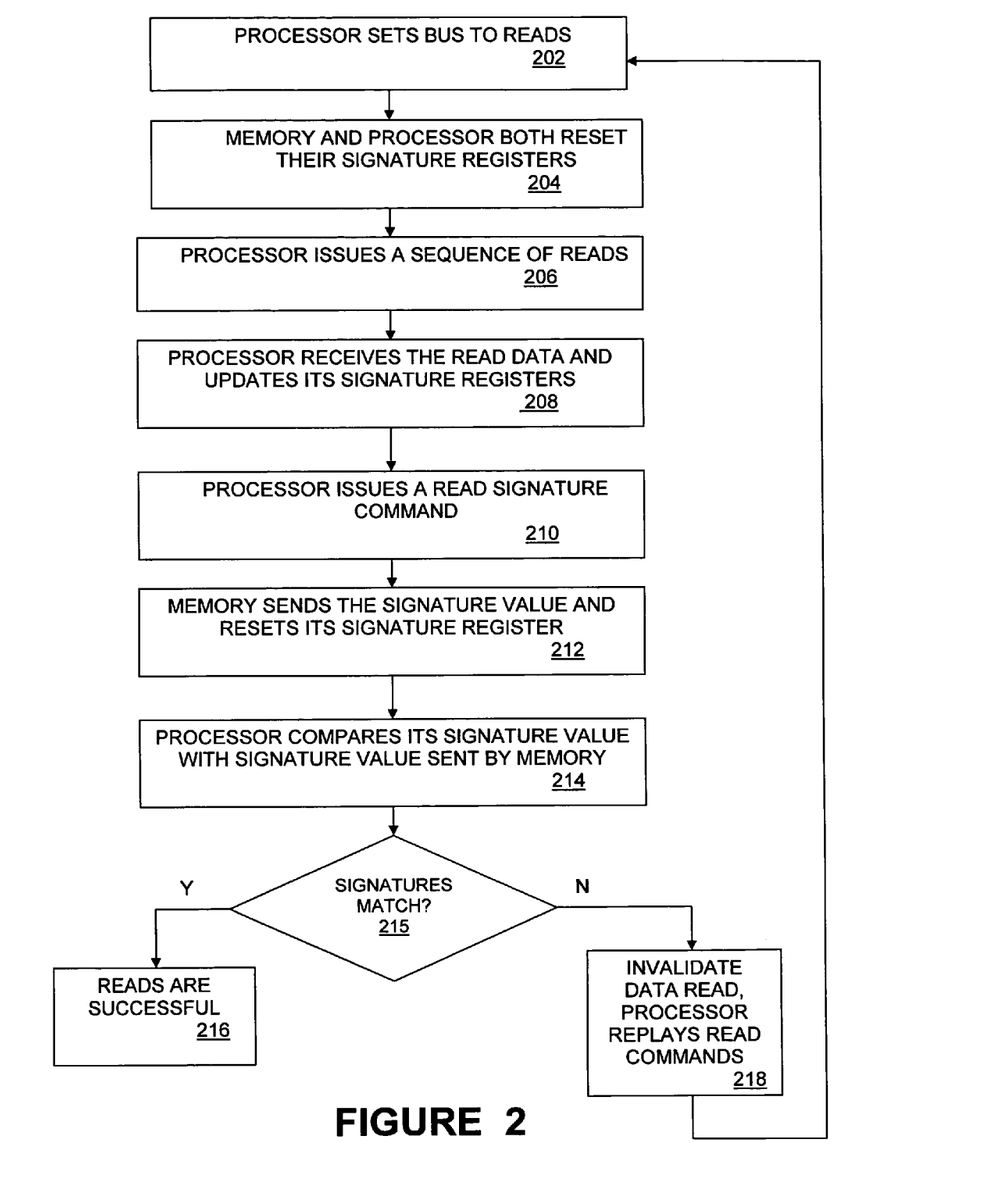
FIG. 2 is a flow diagram of a method for detecting errors during READ operations, according to an embodiment.

FIG. 2 is a flow diagram of a method for detecting errors during READ operations according to an embodiment. At 202, the processor sets the bus for READ operations. The memory, in this case a memory (e.g., DRAM), and the processor each reset their signature registers at 204. The processor issues a sequence of READ commands at 206. The processor receives the READ data that resulted from the READ commands from the memory, and updates its signature register or registers at 208. The processor issues a READ signature (SN) command at 210. The read signature command tells the memory that the value in the memory signature register is to be transferred to the processor. Accordingly, the memory sends the signature value, and resets its signature register at 212.

At 214, the processor compares the value in its own signature register with the received memory signature. If the signatures match, as determined in block 215, the READ operations were successful, as shown at 216. If the signatures do not match, the preceding READ data is invalidated, and the processor replays the previous READ commands at 218. The processor then retries the entire transaction, starting again at block 202.

In various embodiments, the READ data is stored by a memory controller element of the processor whether the processor signature and the memory signature match or not. When "good" data is obtained on a retry operation, the data is transferred to a memory client on whose behalf the data was obtained. In an alternative embodiment, the READ data is transferred to a memory client, on whose behalf the memory controller obtained the data, with information to the client indicating that the data is bad, and the operation must be retried.

Figure 3:
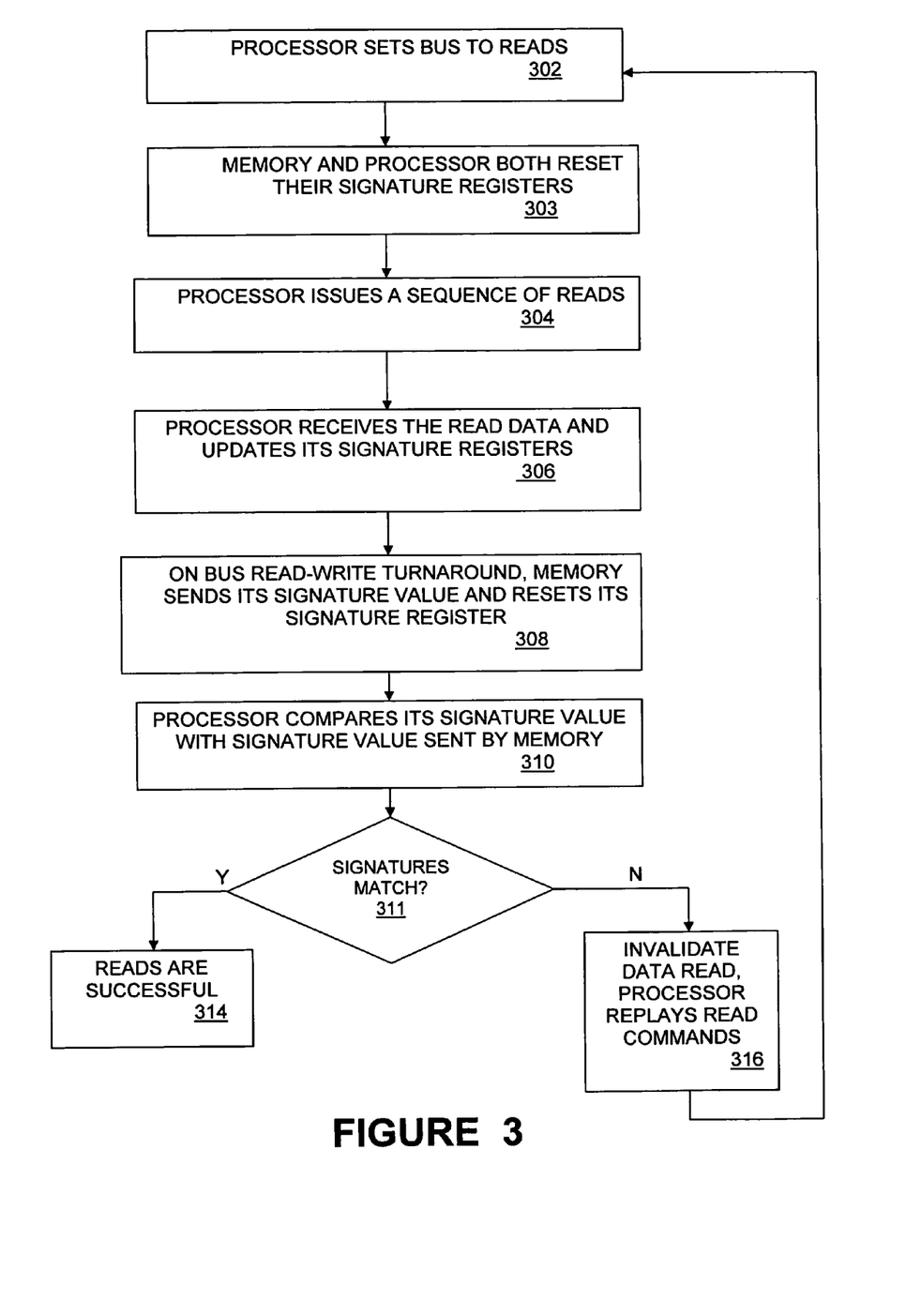
FIG. 3 is a flow diagram of a method for detecting errors during READ operations, according to another embodiment.

FIG. 3 is a flow diagram of a method for detecting errors during READ operations according to another embodiment. At 302, the processor sets the bus for READ operations. The memory and the processor both reset their signature registers at 303. At 304, the processor issues a sequence of READ commands. The processor receives the READ data resulting from the READ commands, and updates its signature register at 306. On the bus READ to WRITE turnaround, the memory sends its signature value, and resets its signature register, as shown at 310. The processor compares its signature value with the signature value sent by the memory at 312. If there is a match, as determined in block 311 the READ operations were successful, as shown in block 314. If there is not a match, the data from the READ operations is invalidated and the processor replays the READ commands, as shown in block 316. The process then proceeds again from block 302.

As described with reference to FIG. 2, depending on the embodiment, the processor may or may not store the READ data without transmitting it to a memory client before the unsuccessful transaction is retried.

Figure 4:
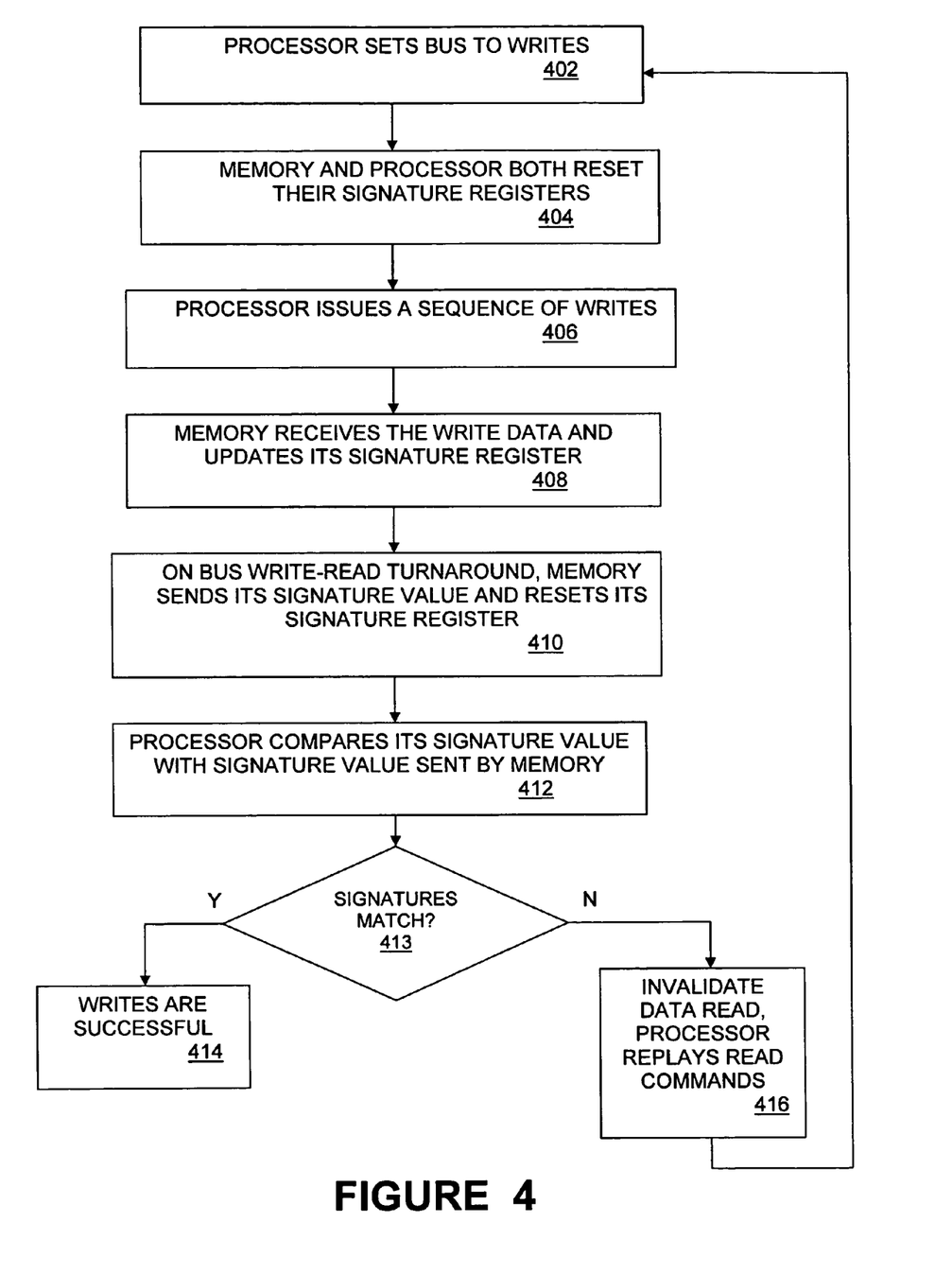
FIG. 4 is a flow diagram of error detection during a WRITE operation, according to an embodiment.

FIG. 4 is a flow diagram of error detection during a WRITE operation, according to an embodiment. The processor sets the bus for WRITE operations at 402. At 404, the memory and the processor both reset their signature registers. The processor issues a sequence of WRITE commands with WRITE data at 406. At 408, the memory receives the WRITE data and updates its signature register. On the bus WRITE to READ turnaround, the memory sends its signature value, and resets its signature register, as shown at 410. The processor compares its signature value with the signature value sent by the memory at 412. If the signatures match, as determined in block 413, the WRITE operations were successful, as shown in block 414. If the signatures do not match, the WRITE operations were not successful, the WRITE data is invalidated, and the processor replays the WRITE commands, block 416. The process then continues with the processor retrying the entire transaction from block 402.

In an alternative embodiment of error detection for WRITE operations (not shown), the processor issues a special WRITE command after each of the processor and memory signature registers are reset, sends it signature value to the DRAM, and resets its signature value. In response to the special WRITE command, the DRAM compares the processor signature value with its own signature value, and uses a sideband signal to communicate the results of the comparison to the processor.

Figure 5:
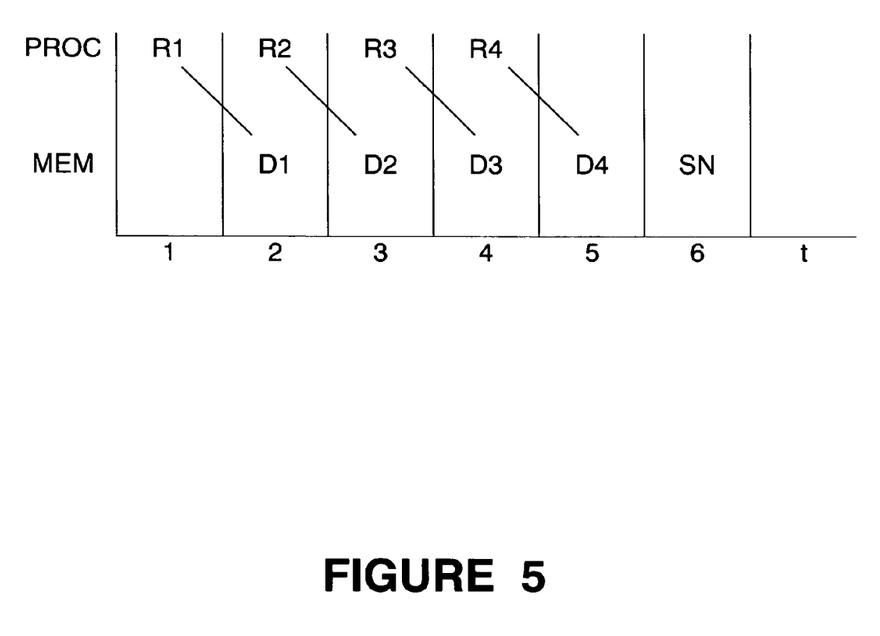
FIG. 5 is a diagram illustrating transmissions on a processor-DRAM interface, according to an embodiment.

FIG. 5 is a diagram illustrating transmissions on the processor-DRAM interface, according to an embodiment such as that described with reference to FIG. 3. On the horizontal axis, reference numbers 1-6 refer to time slots on the interface. On the vertical axis, "PROC" indicates commands sent by the processor, and "MEM" indicates data transferred by the DRAM. Each of time slots 1-6 accommodate a burst transmission as previously described. In time slot 1, the processor issues a READ command R1. In time slot 2, the processor issues a READ command R2. In time slot 3, the processor issues a READ command R3. In time slot 4, the processor issues a READ command R4.

In time slot 2, the DRAM transmits data D1 in response to R1. In time slot 3, the DRAM transmits data D2 in response to R2. In time slot 4, the DRAM transmits data D3 in response to R3. In time slot 5, the DRAM transmits data D4 in response to R4. The bus turnaround occurs between time slots 5 and 6, and in time slot 6, the DRAM transmits its signature, SN to the processor for comparison. If the transmitted signature does not match the corresponding signature stored by the processor, then all of the READ operations shown are invalidated, and must be retried.

An analogous flow process for WRITE operations can be derived from FIG. 5 with WRITE operations (W) substituted for the READ operations (R). Such a flow process could illustrate transmissions on the processor-DRAM interface, according to an embodiment such as that described with reference to FIG. 4.

In general, the error detection system and method according to embodiments utilizes a signature value that is calculated at a first component based on the composition of data that is to be sent to a second component. Upon transmission of the data from the first component to the second component, the second component then calculates a signature value based on the composition of the received data. The first component then sends its signature value to the second component, which then compares the two signature values. If the signatures match, the received data is correct. If the signatures do not match, the received data is contains errors. In a memory controller system, the first component could be a memory device and the second component could be a processor, or vice-versa, and the transmission of data could be a READ operation or a WRITE operation. The signatures are stored in respective memory locations or registers of the first and second components, and the transfer of the signature from the first component to the second component could occur during a bus turnaround period.

Embodiments of the error detection method as described and illustrated may be implemented in or used in conjunction with memory controller systems in graphic processing units or microprocessors for use in personal computers, servers, workstations, game consoles, mobile communication devices, personal digital assistants, and any other similar type of computing device. Aspects of the one or more embodiments described herein may be implemented on a computer, or computers executing software instructions. The computer may be a standalone computer or it may be networked in a client-server arrangement or similar distributed computer network. For the purposes of the present description, the term "processor" or "CPU" refers to any machine that is capable of executing a sequence of instructions and should be taken to include, but not be limited to, general purpose microprocessors, special purpose microprocessors, application specific integrated circuits (ASICs), multi-media controllers, digital signal processors, and micro-controllers, etc.

The memory associated with the system illustrated in FIG. 1, may be embodied in a variety of different types of memory devices adapted to store digital information, such as static random access memory (SRAM), dynamic random access memory (DRAM), synchronous dynamic random access memory (SDRAM), and/or double data rate (DDR) SDRAM or DRAM, and also non-volatile memory such as read-only memory (ROM). Moreover, the memory devices may further include other storage devices such as hard disk drives, floppy disk drives, optical disk drives, etc., and appropriate interfaces.

While the term "component" is generally used herein, it is understood that "component" includes circuitry, components, modules, and/or any combination of circuitry, components, and/or modules as the terms are known in the art.

Embodiments may be implemented as functionality programmed into any of a variety of circuitry, including but not limited to programmable logic devices (PLDs), such as field programmable gate arrays (FPGAs), programmable array logic (PAL) devices, electrically programmable logic and memory devices and standard cell-based devices, as well as application specific integrated circuits (ASICs) and fully custom integrated circuits. Some other possibilities for implementing aspects of the invention include: microcontrollers with memory (such as electronically erasable programmable read only memory (EEPROM)), embedded microprocessors, firmware, software, etc. Furthermore, aspects of the invention may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies such as complementary metal-oxide semiconductor (CMOS), bipolar technologies such as emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "hereunder," "above," "below," and words of similar import, when used in this application, refer to this application as a whole and not to any particular portions of this application.

When the word "or" is used in reference to a list of two or more items, that word covers all of the following interpretations of the word: any of the items in the list, all of the items in the list, and any combination of the items in the list.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings of the invention provided herein can be applied to other systems, not only for systems including graphics processing or video processing or DDR DRAMs as described above. The various operations described may be performed in a very wide variety of architectures and distributed differently than described. In addition, though many configurations are described herein, none are intended to be limiting or exclusive.

In other embodiments, some or all of the hardware and software capability described herein may exist in a printer, a camera, television, a digital versatile disc (DVD) player, a handheld device, a mobile telephone or some other device. The elements and acts of the various embodiments described above can be combined to provide further embodiments. These and other changes can be made to the invention in light of the above detailed description.

In general, in the following claims, the terms used should not be construed to limit the system and method to the specific embodiments disclosed in the specification and the claims, but should be construed to include any processing systems and methods that operate under the claims. Accordingly, the system and method is not limited by the disclosure, but instead the scope of the system and method is to be determined entirely by the claims.

While certain aspects of the system and method are presented below in certain claim forms, the inventors contemplate the various aspects of the system and method in any number of claim forms. For example, while only one aspect of the system and method may be recited as embodied in computer-readable medium, other aspects may likewise be embodied in computer-readable medium. Accordingly, the inventors reserve the right to add additional claims after filing the application to pursue such additional claim forms for other aspects of the system and method for error detection.

What is claimed is:

1. A method, comprising:
    a first component storing a first signature comprising signature data;
    a second component storing a second signature comprising signature data;
    transmitting digital data between a first system component and a second system component over a bidirectional interface in a data operation, the operation comprising a READ operation and a WRITE operation;
    transmitting data from the first system component to the second system component in the course of a data operation;
    during a bus turnaround corresponding to the data operation, the second component transmitting the second signature to the first component, wherein the second signature is stored in a signature register of the second component, and wherein the second component resets the signature register upon transmitting the second signature;
    the second component determining whether the data operation was successful based on a comparison of the first signature and the second signature.

2. The method of claim 1, wherein the first signature and the second signature both comprise a checksum value.

3. The method of claim 2, wherein the checksum value for each of the first signature and the second signature is generated by a hash function for a cyclic redundancy check process.

4. The method of claim 1, wherein the first component comprises a processor including a memory controller component, and the second component comprises a memory device.

5. The method of claim 4, wherein the processor component comprises at least a portion of a graphics processing unit, and wherein the memory device is selected from the group consisting of DRAM, SRAM, DDR memory, ROM, and disk media.

6. A method, comprising:
    transmitting data from a first component to a second component;
    storing a first signature value in a memory location of the first component, the first signature value derived from the composition of the transmitted data;
    receiving the data in the second component;
    storing a second signature value in a memory location of the second component, the second signature value derived from the composition of the received data;
    transmitting the first signature value to the second component wherein the first signature value is transmitted to the second component during a bus turnaround period corresponding to the data transmission, wherein the first signature value is stored in a signature register of the first component, and wherein the first component resets the signature register upon transmitting the first signature value; and
    the second component comparing the first signature value to the second signature value to determine the integrity of the received data, wherein the second component resets the second signature value upon transmitting the second signature value.

7. The method of claim 6, wherein the first signature and the second signature both comprise a checksum value.

8. The method of claim 7, wherein the checksum value for each of the signature received from the second component and the signature stored in the first component is generated by a hash function for a cyclic redundancy check process.

9. The method of claim 6, wherein the first component comprises a processor including a memory controller component, and the second component comprises a memory device.

10. The method of claim 9, wherein the data is transmitted in one of a memory read operation and a memory write operation.

11. The method of claim 9, wherein the processor component comprises at least a portion of a graphics processing unit, and wherein the memory device is selected from the group consisting of DRAM, SRAM, DDR memory, ROM, and disk media.

12. A system, comprising:
    a first component; and
    a second component coupled to the first component over a bidirectional interface, the operations of the second component controlled by the first component, wherein,
    the first component performs data operations using the second component, a data operation comprising transmitting data from the first component to the second component, storing first signature data derived from the transmitted data in a first signature register, and further transmitting the first signature data concurrently with resetting the first signature register, and the second component comparing the first signature data to second signature data stored by the second component to determine the integrity of the data operation, wherein the second component resets the second signature value upon transmitting the second signature value.

13. The system of claim 12, wherein an identical match between the first signature and the second signature indicates that the data received is identical to the data transmitted.

14. The system of claim 13, wherein the first signature and the second signature both comprise a checksum value.

15. The system of claim 14, wherein the checksum value for each of the first signature and the second signature is generated by a hash function for a cyclic redundancy check process.

16. The system of claim 12, wherein the first component comprises a processor including a memory controller component, and the second component comprises a memory device.

17. The system of claim 16, wherein the data is transmitted in one of a memory read operation and a memory write operation.

18. The system of claim 17, wherein the first signature is transmitted to the second component during a bus turnaround period of the bidirectional interface.

19. The system of claim 17, wherein the processor component comprises at least a portion of a graphics processing unit, and wherein the memory device is selected from the group consisting of DRAM, SRAM, DDR memory, ROM, and disk media.

20. A method, comprising:
a first memory controller component storing a signature in a signature register;
receiving a signature from a first, memory controlling component in the course of a memory access operation with a memory device, wherein the signature received corresponds to data received from the first memory controller component, the first memory controller component also resetting the signature register; and
responsive to comparing the signature received to a signature stored by the memory device, determining whether the data received was received without error, wherein the signature received and the signature stored by the memory device are derived from the data received, wherein the memory device resets the signature stored by the memory device before transmitting that signature to the memory controller component.

21. The method of claim 20, wherein the signature is received during read-write turnaround period of a bidirectional interface coupled to the memory device.

22. The method of claim 21, wherein the received signature and the stored signature both comprise a checksum value.

23. A method, comprising:
a first component transmitting data to a second component according to a transaction, and in response to the transmission of data, receiving a signature from the second component in a same transaction period as the transaction, the signature corresponding to the transmitted data;
the second component resetting a signature register concurrent with transmitting the transmitted data; and
the first component comparing the received signature to a stored signature to determine whether the transmitted data was received by the second component without error.

24. The method of claim 23, wherein the component comprises a memory device, and further wherein the data is transmitted in a write operation to the memory device.

25. The method of claim 24, wherein the signature is received during write-read turnaround period of a bidirectional interface coupled to the memory device.

26. The method of claim 25, wherein the received signature and the stored signature both comprise a checksum value.

* * * * *